United States Patent
Boldrini et al.

(10) Patent No.: US 7,090,630 B2
(45) Date of Patent: Aug. 15, 2006

(54) MACHINE FOR FORMING CONTAINERS IN PARTICULAR CONTAINERS FOR FOOD PRODUCTS

(75) Inventors: Fulvio Boldrini, Ferrara (IT); Roberto Ghiotti, Calderino di Monte San Pietro (IT); Stefano Cavallari, Bologna (IT)

(73) Assignee: Azionaria Costruzioni Macchine Automastiche A.C.M.A. S.p.A., Bologna (IT)

( * ) Notice: Subject to any disclaimer, the term of this patent is extended or adjusted under 35 U.S.C. 154(b) by 0 days.

(21) Appl. No.: 10/489,965

(22) PCT Filed: Jul. 14, 2003

(86) PCT No.: PCT/IB03/03160

§ 371 (c)(1),
(2), (4) Date: Mar. 18, 2004

(87) PCT Pub. No.: WO2004/011238

PCT Pub. Date: Feb. 5, 2004

(65) Prior Publication Data

US 2004/0235632 A1  Nov. 25, 2004

(30) Foreign Application Priority Data

Jul. 25, 2002 (IT) .......................... BO2002A0486

(51) Int. Cl.
*B31B 1/00* (2006.01)
(52) U.S. Cl. .......................... 493/51; 493/87; 493/175; 493/252
(58) Field of Classification Search .................. 493/51, 493/52, 87, 142, 155, 175, 252; 53/561, 53/563

See application file for complete search history.

(56) References Cited

U.S. PATENT DOCUMENTS

| 3,486,423 A | * | 12/1969 | Mistarz | 493/164 |
| 3,619,979 A | * | 11/1971 | Martensson et al. | 53/565 |
| 4,386,923 A | * | 6/1983 | Okushita | 493/87 |
| 4,604,850 A | * | 8/1986 | Reil | 53/423 |
| 4,690,667 A | * | 9/1987 | Domke | 493/213 |
| 4,788,811 A | * | 12/1988 | Kawajiri et al. | 53/426 |

(Continued)

FOREIGN PATENT DOCUMENTS

CH            413339          5/1966

(Continued)

*Primary Examiner*—Sameh H. Tawfik
(74) *Attorney, Agent, or Firm*—Timothy J. Klima (57) ABSTRACT

Containers (2) for food products are manufactured on a machine (1) equipped with a feed station (4) supplying a single file of tubular elements (2a), a first heat sealer (10) by which a first open end (2b) of each tubular element (2a) is closed and secured, and a first rotary conveyor (3) capable of movement between a first operating position in which the tubular elements (2a) are taken up from the feed station (4), and a second operating position in which the tubular elements (2a) are offered to the first heat sealer (10). The same machine (1) is equipped with a second heat sealer (36) such as will complete the container (2) by closing and securing a second open end (2c) of each tubular element (2a) opposite to the first open end (2b), and incorporates a second rotary conveyor (32) located between the first conveyor (3) and the second heat sealer (36), capable of movement between a first operating position in which the partly enclosed tubular elements (2a) are taken up from the first conveyor (3), and a second operating position in which the tubular elements (2a) are offered to the second heat sealer (36).

23 Claims, 8 Drawing Sheets

U.S. PATENT DOCUMENTS 4,986,058 A * 1/1991 Carlsson et al. ............... 53/563
5,088,642 A    2/1992 Farber
5,829,228 A * 11/1998 Mogard ........................ 53/412
6,676,585 B1 * 1/2004 Stahlecker et al. ........... 493/87

FOREIGN PATENT DOCUMENTS

WO        0020194       4/2000

* cited by examiner

MACHINE FOR FORMING CONTAINERS IN PARTICULAR CONTAINERS FOR FOOD PRODUCTS

TECHNICAL FIELD

The present invention relates to a machine for forming containers, in particular containers for food products, whose characterizing features are as recited below.

More precisely, and with no limitation implied, the present invention is applicable to systems used in manufacturing a variety of containers for food products and, in particular, containers designed for packaging liquid products, typically milk, fruit juices, yoghurt, mineral water and other such substances.

BACKGROUND ART

It is common practice bottling the aforementioned liquid products in containers whose structure can be manufactured from multilayer or treated paper material, such as paperboard or cardboard coated with one or more layers of food-safe material suitable for liquid substances.

The containers in question are fashioned in most cases from flat blanks cut generally from a roll of material and folded as necessary along strategically placed crease lines to a shape suitable for holding a liquid product.

As a rule, such containers present a tubular structure of substantially square cross section.

The containers are manufactured using conventional machines which will bend the flat blank to fashion a tubular element presenting an open top end and an open bottom end.

First, mechanical arms are arranged for folding the edges of the open bottom end of the tubular element so as to close this same end. The resulting end folds are secured one to another by a heat seal effected with special plates positioned to engage selected areas of the folds.

The partially enclosed container is then filled with a liquid product directed in through the open top end. Thereafter, the top end is closed by bending the relative edges and securing the folds in same way as for the bottom end already described above.

Machines of the type in question present a notable drawback deriving from the fact that they are not equipped to handle containers of the type with a top end presenting a duct, identifiable typically as a tubular adapter or "neck" from which to pour the liquid contents and affording a mouth that can be closed by means of a suitable cap.

The neck fashioned generally in plastic material, must necessarily be anchored to the tubular body by heat sealing or welding operation in which the base of the neck is joined to the top edges coinciding with the open top end of the container. The particular position of the neck, which is centered on the longitudinal axis of the container, requires for its application an appreciable degree of precision.

Machines embraced by the prior art used currently to produce containers of the type in question are made up of particularly cumbersome and complex devices capable of dosing and sealing only one open end of the container.

More exactly, a first machine is applied to close the bottom end of the container, whereupon the partially closed container is transferred to a second machine that will close the top end together with the relative neck. Accordingly, the manufacture of one container involves the use of two different and separate machines, each designed to close and seal just one of the two open ends.

These machines present a major drawback deriving from the complexity of a manufacturing process in which the single container must pass from one machine to the other, with the result that the production costs and processing times involved become excessive.

Moreover, it will be appreciated that with two machines in operation, not only do the overall dimensions of the equipment become excessive, but there is also the significant drawback of having to provide a conveyor system, utilizing belts for example, such as will transfer the partially enclosed containers from one machine to the other.

SUMMARY OF THE INVENTION

The object of the present invention, is to provide a machine for forming containers, in particular containers for food products, such as will close and seal both ends of the container.

More exactly, it is an object of the invention to provide a machine for forming containers such as will close the bottom end of the containers and attach the neck to the top end, without any need to use two separate machines of the same type.

DISCLOSURE OF THE INVENTION

The stated objects and others besides, which will emerge more clearly from the following specification, are substantially realized in a machine for forming containers, in particular containers for food products, whose characterizing features are as recited below.

The invention will now be described in detail, by way of example, with the aid of the accompanying drawings, in which.

With reference to the drawings, 50 denotes a system, in its entirety, incorporating a machine 1 for forming containers 2 according to the present invention.

Figure 1:
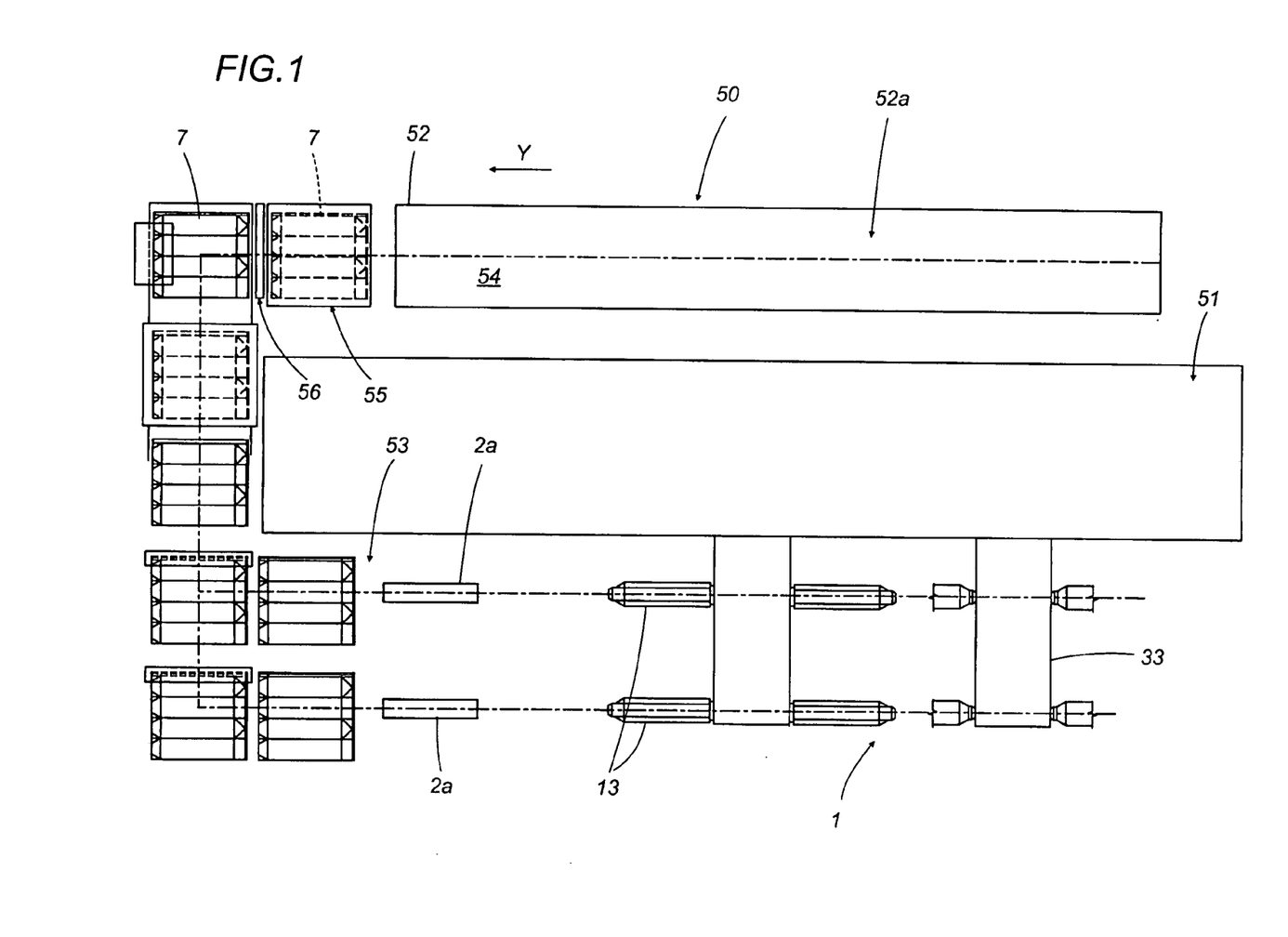
FIG. 1 is a plan view of a system for forming containers.

As indicated in FIG. 1, the system 50 comprises a supporting structure 51 and, associated with this same structure, a forming sector 52 serving to prepare at least one blank 7 from which to fashion a relative container 2, also a shaping sector 53 operating downstream of the forming sector 52, of which the function is to fold the single blanks 7 emerging from the forming sector and establish the shape of the respective folded containers 2 by means of a fixing operation. The machine for forming containers according to the present invention is designed to operate in the shaping sector 53 of such a system, as will be described in due course.

In particular, the forming sector 52 comprises a feed station 52a by which a continuous strip 54 of forming material suitable for preserving liquid food products is directed along a predetermined feed path denoted Y. The forming material will consist preferably of a multilayer or treated paper material, such as paperboard or cardboard coated with an impermeable and antiseptic film.

The feed station 52a also comprises a plurality of guide elements, consisting preferably in rollers, serving to establish a first feed path followed by the forming material that extends externally of the supporting structure 51 of the system 50 along a direction substantially parallel to the longitudinal dimension of the selfsame supporting structure.

The system 50 can be equipped with a numbering device serving to mark consecutive portions of the forming material coinciding with the single blanks 7. The numbering device operates between successive guide elements of the feed station 52a in such a way as to mark the forming material at a stage along the feed path where the strip extends substantially in a horizontal plane.

The forming sector 53 includes a scoring station 55 positioned downstream of the feed station 52a, by which each portion of the forming material destined to provide a relative blank 7 is impressed with at least one crease line. In a preferred embodiment, the scoring station 55 is designed to generate a plurality of crease lines, in a single operation, by which the shape of the container 2 being manufactured is marked out on the flat surface of the forming material.

The scoring station 55 comprises at least one press presenting mutually opposed dies offered to the two faces of the forming material. In operation, the press will alternate between an idle position in which the two dies are distanced from the forming material interposed between them, and an operating position in which they are brought together forcibly against the forming material in such a way as to generate the aforementioned crease lines.

The forming sector 53 also comprises a cutting station 56 operating downstream of the scoring station 55, by which the creased forming material is taken up from this same station and divided into successive discrete pieces each constituting a respective blank 7. The cutting station 56 comprises at least one blade positioned to operate in close proximity to the scoring station 55 so that the forming material can be cut immediately adjacent to the press. In operation, like the press, the blade alternates between an idle position distanced from the forming material, and an operating position of engagement with the selfsame material, in which the strip is cut transversely. To advantage, the blade can be timed to alternate between the idle position and the operating position synchronously with the movement of the press of the scoring station 55 between the relative idle and operating positions, so that the dies and the blade are made to engage the forming material simultaneously.

Thereafter, the creased and cut blank 7 passes to the shaping sector 53 and is taken up by the machine to which the present invention refers.

Referring to the accompanying drawings, 1 denotes a machine for forming containers 2, in its entirety, embodied in accordance with the present invention.

The machine 1 comprises a first mechanism 3 by means of which to convey a plurality of tubular elements 2a constituting the containers 2.

More exactly, the tubular elements 2a are advanced by way of a feed station 4 toward the conveying mechanism 3, ordered in single file. The tubular elements 2a are prepared by a forming device 5 coinciding with and operating at the feed station 4.

Figure 3:
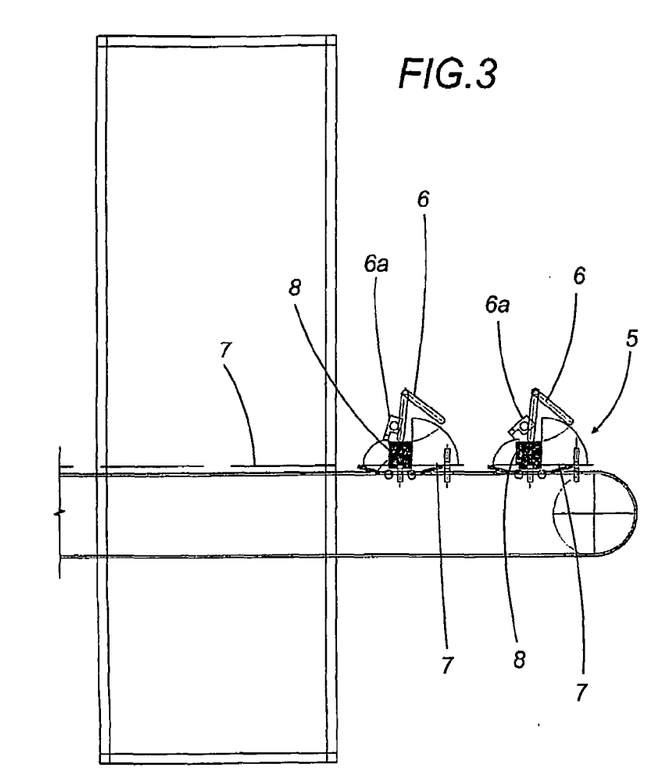
FIG. 3 shows a forming device located upstream of the machine according to the invention, viewed in a side elevation.

In greater detail, and as illustrated to advantage in FIG. 3, the forming device 5 presents a gripper element 6 serving to bend the blank 7 of multilayer or treated paper material, typically paperboard or cardboard coated with one of more layers of food-safe material suitable for liquid products. The blank is wrapped by the gripper element 6 around a former 8 of shape corresponding to the shape of the tubular element 2a, in such a way that one longitudinal edge of the selfsame blank 7 will overlap the other.

The forming device 5 also presents a sealer 6a serving to join the longitudinal edges and create the tubular element 2a, and a feed mechanism 9 by which the tubular element 2a is caused to advance along a radial infeed direction A toward the first conveying mechanism 3.

The machine could also operate utilizing blanks 7 supplied to the feed station 4 in a precreased tubular configuration, collapsed so as to present an essentially flat rhomboidal cross section.

In this situation, the system 50 could include a forming device 5 of conventional embodiment embraced by the prior art, comprising a gripper element 6 that can be offered to the two opposite side edges of the precreased tubular blank 7 in such a way as to apply a compressive force and thus cause the flattened profile to expand to a substantially square profile when viewed in section. The operation of erecting flat glued tubular blanks in this fashion will be familiar to a person skilled in the art.

The first conveying mechanism 3 is disposed facing the feed station 4 and capable of movement between a first operating position in which a single tubular element 2a is taken up from the feed station 4, and a second operating position in which the tubular element 2a is offered to respective first sealing means 10.

More exactly, the first conveying mechanism 3 comprises at least one first wheel 11 rotatable in a first feed direction B along a first circular sealing path P' passing through the feed station 4 and the first sealing means 10.

The first wheel 11 is composed of a central hub 12 rotatable about a respective axis 12a, and a plurality of supporting elements 13 serving to carry the tubular elements 2a. The supporting elements 13 project radially from the hub 12, each presenting a first end 13a anchored to the selfsame hub 12, and a second end 13b, opposite to the first, appearing substantially cylindrical in shape and smaller in section than the remainder of the element 13.

Figure 4:
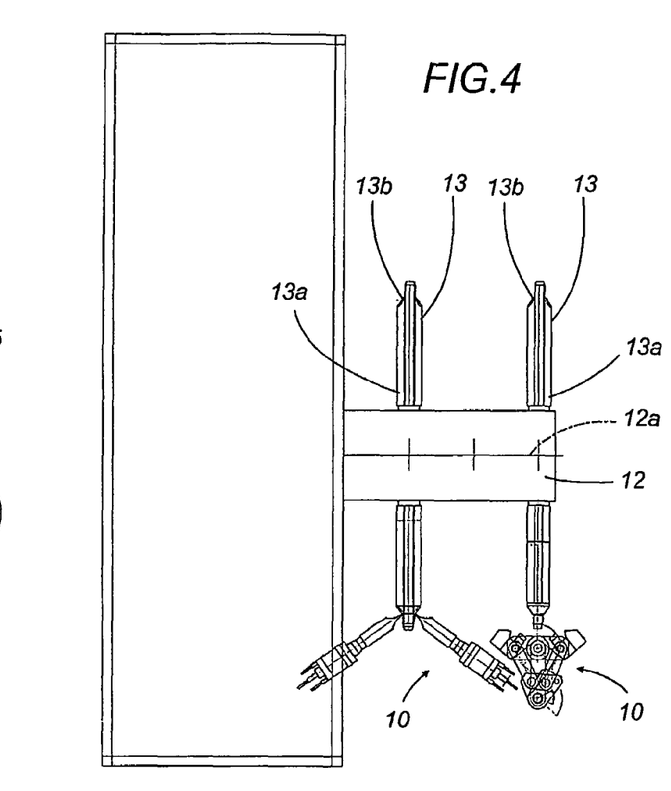
FIG. 4 shows a detail of FIG. 1, viewed in a side elevation.

To advantage, as indicated in FIG. 4, the system comprises two first wheels 11 disposed one alongside the other, each presenting a relative set of supporting elements 13 arranged around the respective hub 12.

In detail, each supporting element 13 presents a substantially parallelepiped geometry complementing the internal shape of the tubular element 2a. In the example of the drawings, the tubular element 2a is substantially parallelepiped in appearance and of square cross section. Consequently, the supporting element 13 will present a square parallelepiped shape identical to that of the tubular element 2a.

Accordingly, each tubular element 2a can be fitted over a respective supporting element 13 in such a way that the respective first open end 2b of the selfsame element 2a is positioned to coincide with the second end 13b of the supporting element 13.

At a given point along the first sealing path P', upstream of the feed station 4 supplying the tubular elements 2*a*, considered in relation to the first feed direction B, the machine comprises a feed device 14 supplying necks 15 for the containers 2. The function of the feed device 14 in question is to place one neck 15 on the second end 13*b* of each supporting element 13. The shape of the second end 13*b* is matched to the internal geometry of the neck 15, which consists in a tubular body preferably of plastic material, presenting a mouth 15*a* uppermost and a substantially square base 15*b* at the end of the body opposite from the mouth 15*a*. The four sides of the base constitute connecting portions 15*c* offered to the tubular element 2*a* in positions parallel with corresponding first and second top faces 16 and 17 of the selfsame tubular element 2*a*.

The aforementioned first sealing means 10 are positioned along the first sealing path P' and in particular downstream of the feed station 4, relative to the first feed direction B, in such a way as to interact with and close the first open end 2*b* of each tubular element 2*a* by fixing the relative neck 15.

Preferably, as illustrated in FIG. 4, each set of supporting elements 13 is equipped with respective first sealing means 10.

In particular, the first sealing means 10 of each wheel 11 consist in a first joining head 10*a* able to interact with the tubular element 2*a* in such a way as to seal two connecting portions 15*c* of the neck 15, positioned on the second end 13*b* of the supporting element 13, to the two mutually opposed first top faces 16 of the tubular element 2*a*.

In addition, the first sealing means 10 comprise a second joining head 10*b* operating downstream of the first joining head 10*a*, relative to the first feed direction B, interacting with the tubular element 2*a* in such a way as to seal two connecting portions 15*c* of the neck 15 to the two mutually opposed second top faces 17 of the tubular element 2*a*.

Figure 5A:
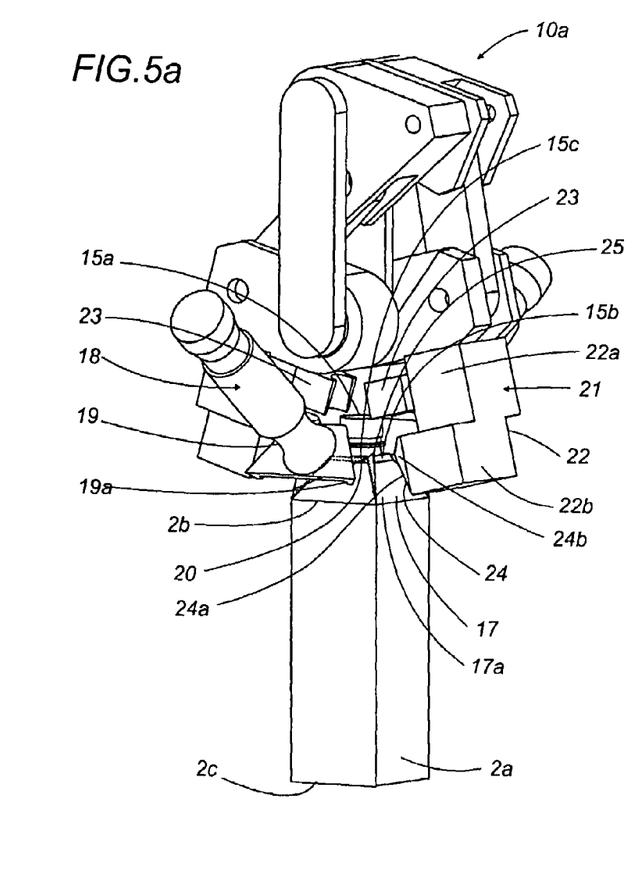
FIGS. 5*a* and 5*b* are perspective views showing a detail of the machine for forming containers, together with a respective container in process, illustrated in two relative operating positions.
Figure 5B:
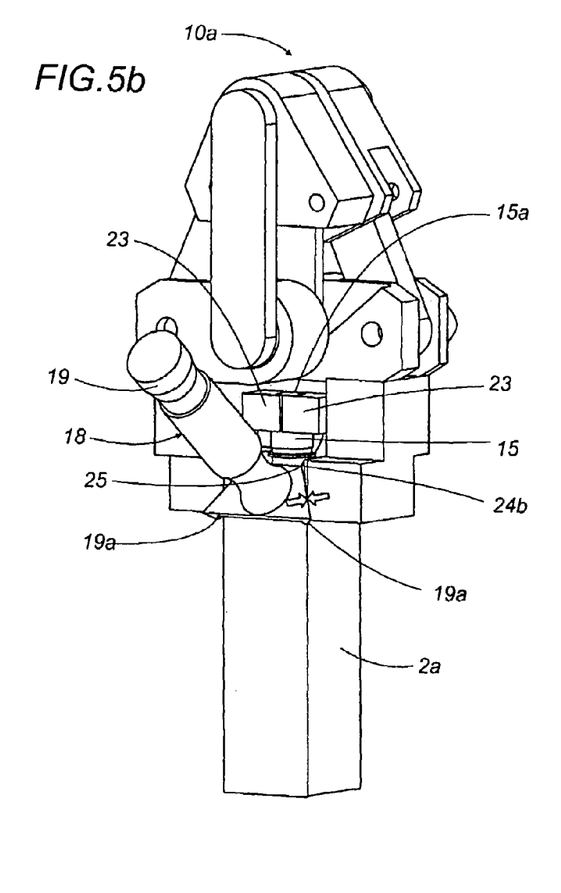

As illustrated to advantage in FIGS. 5*a* and 5*b*, the first joining head 10*a* consists in at least two mutually opposed first forming elements 18 capable of movement between a first idle position, distanced from the first top faces 16 of the tubular element 2*a* (FIG. 5*a*), and a second operating position in which the first top faces 16 are engaged by the selfsame forming elements 18 and sealed to the respective connecting portions 15*c* of the neck 15 (FIG. 5*b*).

Each first forming element 18 is set in motion by conventional actuator means, which are neither described nor illustrated, and comprises a sealer or welder 19 likewise of conventional type used widely in the manufacture of food containers. More exactly, the sealer or welder 19 might be a heat sealing or an ultrasound or induction welding instrument but in any event will present heatable rectilinear portions 19*a* arranged in such a way as to present a substantially trapezoidal outline and applicable when in the operating position to respective seal lines 20.

These same seal lines 20 (indicated by phantom lines in the drawings) are located on the first top faces 16 of the tubular element and along the connecting portions 15*c* of the neck, describing a substantially trapezoidal outline.

The first joining head 10*a* also comprises two mutually opposed first reaction elements 21 capable of movement transversely to the first forming elements 18 between a first idle position distanced from the second top faces 17, assumed when the first forming elements 18 occupy the relative first idle position, and a second operating position of contact with the second top faces 17, assumed when the first forming elements 18 occupy the relative second operating position. In this situation, as illustrated in the drawings, the first forming elements 18 and the first reaction elements 21 function as the jaws of a gripper converging on the tubular element 2*a*.

More exactly, each first reaction element 21 presents a substantially parallelepiped main body 22 comprising a top portion 22*a* offered to the neck 15 and a bottom portion 22*b* offered to a corresponding second top face 17.

The top portion 22*a* presents a locating portion 23, projecting from the selfsame top portion 22*a* and presenting a substantially "U"-shaped cross sectional profile internally. The locating portion 23 thus embodied is contoured to match the profile of the neck 15, and offered to a top cylindrical portion of the neck 15 near to the mouth 15*a*.

When the first reaction elements 21 are in the operating position, accordingly, they will close around the neck 15 as illustrated in FIG. 5*b*.

The bottom portion 22*b* of each first reaction element 21 presents a bearing surface 24 offered to the respective second top face 17. The surface 24 in question comprises a flat central portion 24*a* positioned below the locating portion 23, and designed to breast with a central surface 17*a* of the corresponding second top face 17.

More particularly, the flat central portion 24*a* of the bearing surface 24 presents a substantially trapezoidal outline, so that the central surface 17*a* of the second top face 17 can be invested with a trapezoidal shape.

In addition, each oblique side of the flat central portion 24*a* presents a respective lateral portion 24*b* of which the surface is angled relative to that of the central portion 24*a*, so that the selfsame central portion 24*a* is caused to project from the bottom portion 22*b* as discernible in FIGS. 5*a* and 5*b*

The lateral portions 24*b* present a substantially triangular outline and combine with the heatable rectilinear portions 19*a* of the sealer 19 to create corresponding fins 25 located along the external corner edges of the tubular element 2*a*.

Figure 6A:
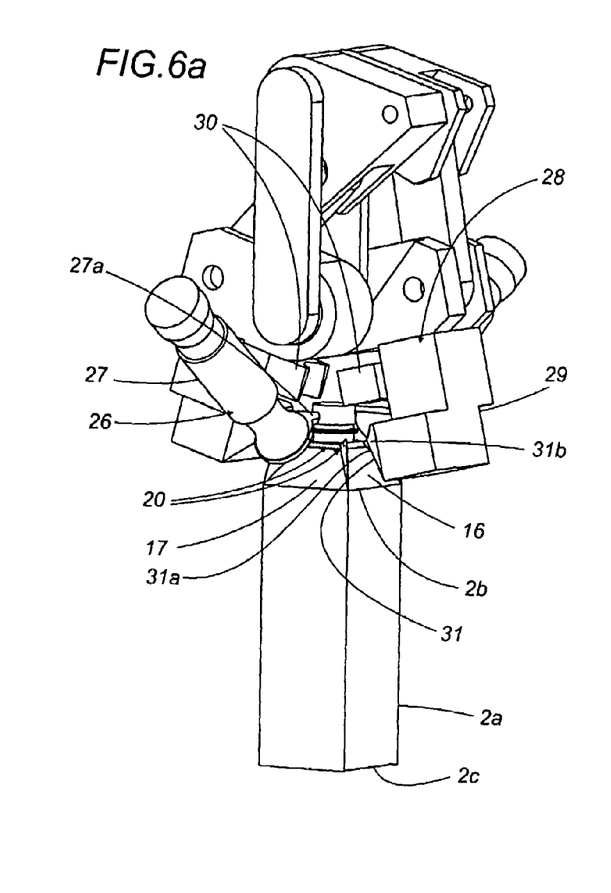
FIGS. 6*a* and 6*b* are perspective views showing a second detail of the machine for forming containers, together with a respective container in process, illustrated in two relative operating positions.
Figure 6B:
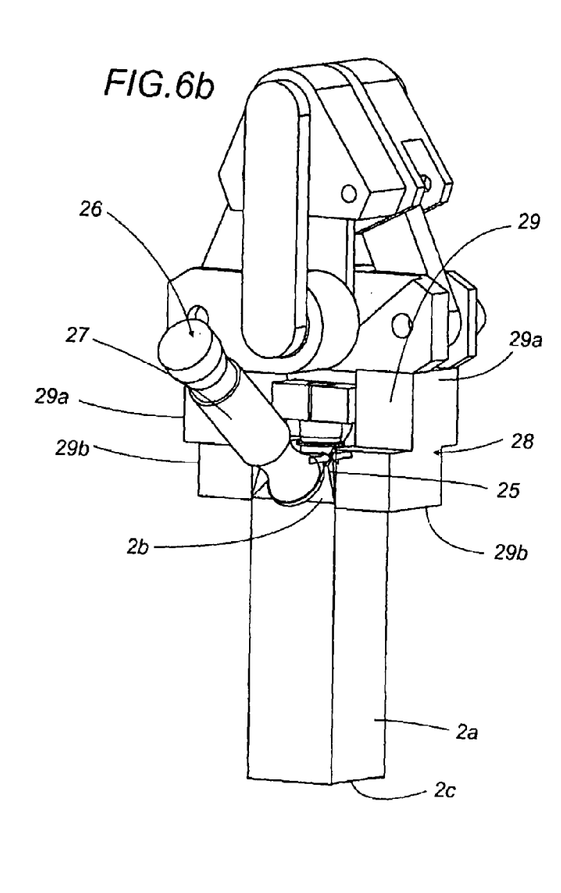

As illustrated to advantage in FIGS. 6*a* and 6*b*, the second joining head 10*b* consists in at least two mutually opposed second forming elements 26 capable of movement between a first idle position, distanced from the respective second top faces 17 of the tubular element 2*a* (FIG. 6*a*), and a second operating position in which the second top faces 17 are engaged by the selfsame forming elements 26 and sealed to the respective connecting portions 15*c* of the neck 15 (FIG. 6*b*).

Each second forming element 26 is set in motion by relative actuator means, and comprises a sealer or welder 27 of conventional type as used widely in the manufacture of food containers. More exactly, the sealer or welder 27 might be a heat sealing or an ultrasound or induction welding instrument.

The sealer 27 also presents a heatable rectilinear portion 27*a* such as will engage a respective seal line 20 when the forming element occupies the second operating position. The seal line 20 in question corresponds substantially to the area of the join between the second top face 17 and the connecting portion 15*c*.

The second joining head 10*b* also comprises two mutually opposed second reaction elements 28 capable of movement transversely to the second forming elements 26 between a first idle position distanced from the first top faces 16, assumed when the second forming elements 26 occupy the relative first idle position, and a second operating position of contact with the first top faces 16, assumed when the second forming elements 26 occupy the relative second operating position. In this situation, as illustrated in the drawings, the second forming elements 26 and the second reaction elements 28 are arranged substantially in the same manner as the first forming elements 18 and the first reaction elements 21, with the difference that they are designed to seal two opposite faces of the tubular element 2a not sealed by the first joining head 10a.

In effect, each second reaction element 28 appears identical to the first reaction element 21, with a substantially parallelepiped main body 29 comprising a top portion 29a offered to the neck 15 and a bottom portion 29b offered to the first top faces 16.

The top portion 29a presents a locating portion 30, projecting from the selfsame portion 29a and presenting a substantially "U"-shaped cross sectional profile internally. The locating portion 30 thus embodied is contoured to match the profile of the neck 15, and offered to a top cylindrical portion of the neck 15 near to the mouth 15a.

When the second reaction elements 28 are in the operating position, accordingly, they will close around the neck 15 as illustrated in FIG. 6b.

The bottom portion 29b of each second reaction element 28 presents a bearing surface 31 offered to the respective first top face 16. The surface 31 in question comprises a flat central portion 31a positioned below the locating portion 30, and designed to breast with a central surface 16a of the corresponding first top face 16 secured in place previously by the first joining head 10a.

More particularly, the flat central portion 31a of the bearing surface 31 presents a substantially trapezoidal outline, so that the central surface 16a of the first top face 16 can be invested with a trapezoidal shape.

In addition, each oblique side of the flat central portion 31a presents a respective lateral portion 31b of which the surface is angled relative to that of the central portion 31a, so that the selfsame central portion 31a is caused to project from the bottom portion 29b as discernible in FIGS. 6a and 6b.

The lateral portions 31b present a substantially triangular outline and are designed to bear against respective fins 25 located along the external corner edges of the tubular element 2a, in like manner to the corresponding portions of the first reaction elements 21 already described.

The machine 1 also comprises a second conveying mechanism 32 operating in conjunction with the first conveying mechanism 3, downstream of the first sealing means 10 considered in relation to the feed direction B. The second mechanism 32 is capable of movement between a first operating position in which the tubular elements 2a are taken up from the first conveying mechanism 3, and a second operating position in which the tubular elements 2a are offered to respective second sealing means 36.

The second conveying mechanism 32 comprises a second wheel 33 similar to the first wheel 11 and rotatable in a second feed direction C along a second circular sealing path P‴ tangential to the first sealing path P′.

The second sealing path P‴ passes adjacent to the first conveying mechanism 2 and to the aforementioned second sealing means 36.

The second wheel 33 comprises a central hub 33a rotatable about a respective axis, and a plurality of holder elements 34 projecting radially from the central hub 33a.

In particular, each holder element 34 presents an essentially tubular appearance and affords an access opening 34a at the end farthest from the hub 33a, also an internal surface matched to the external geometry of the tubular element 2a. Thus, the single tubular element 2a is insertable into a corresponding holder element 34 in such a way that a second open end 2c, opposite to the first open end 2b, is positioned to coincide with the access opening 34a.

Figure 2A:
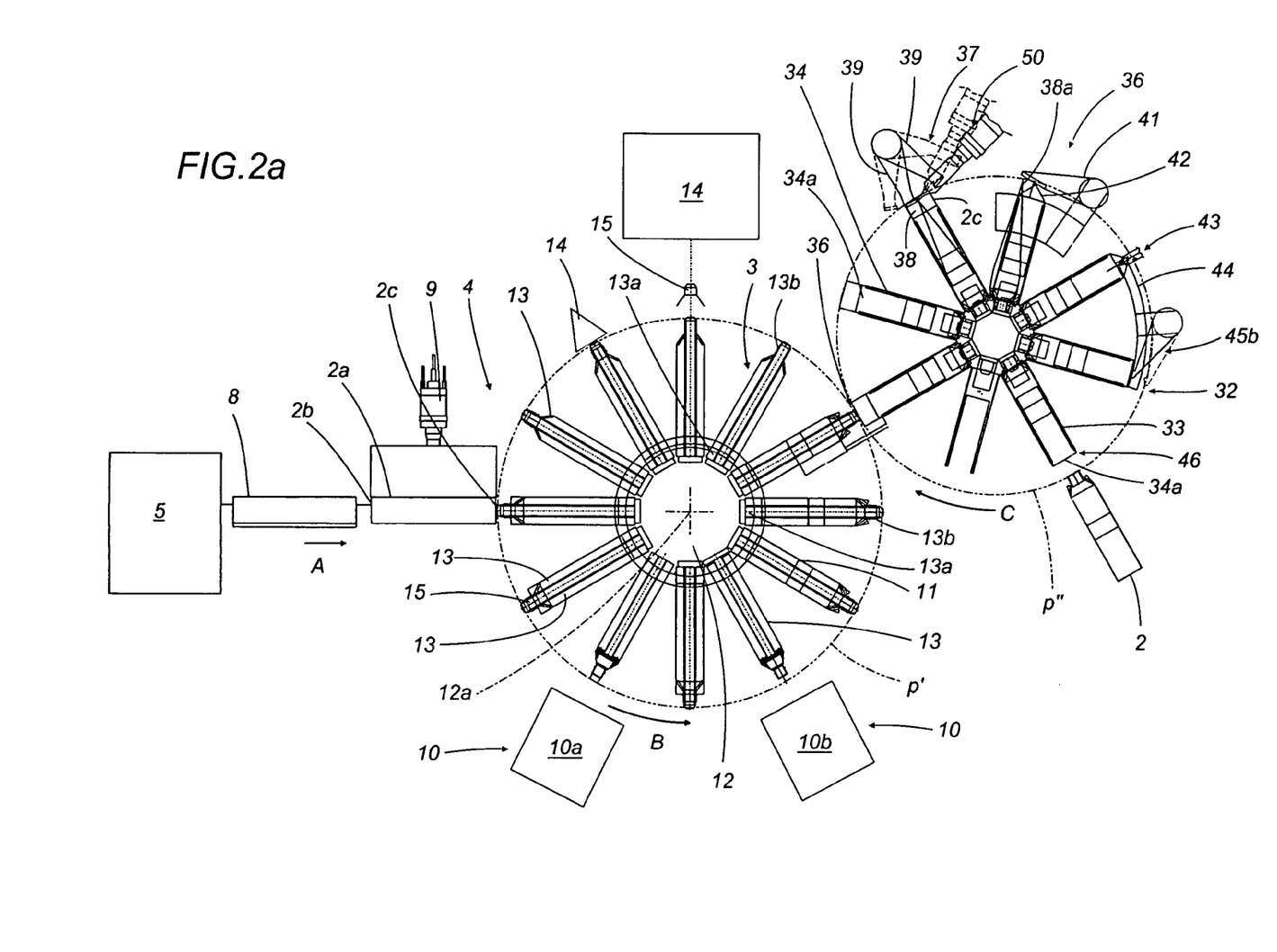
FIG. 2*a* shows a machine for forming containers according to the present invention, viewed in a side elevation.
Figure 2B:
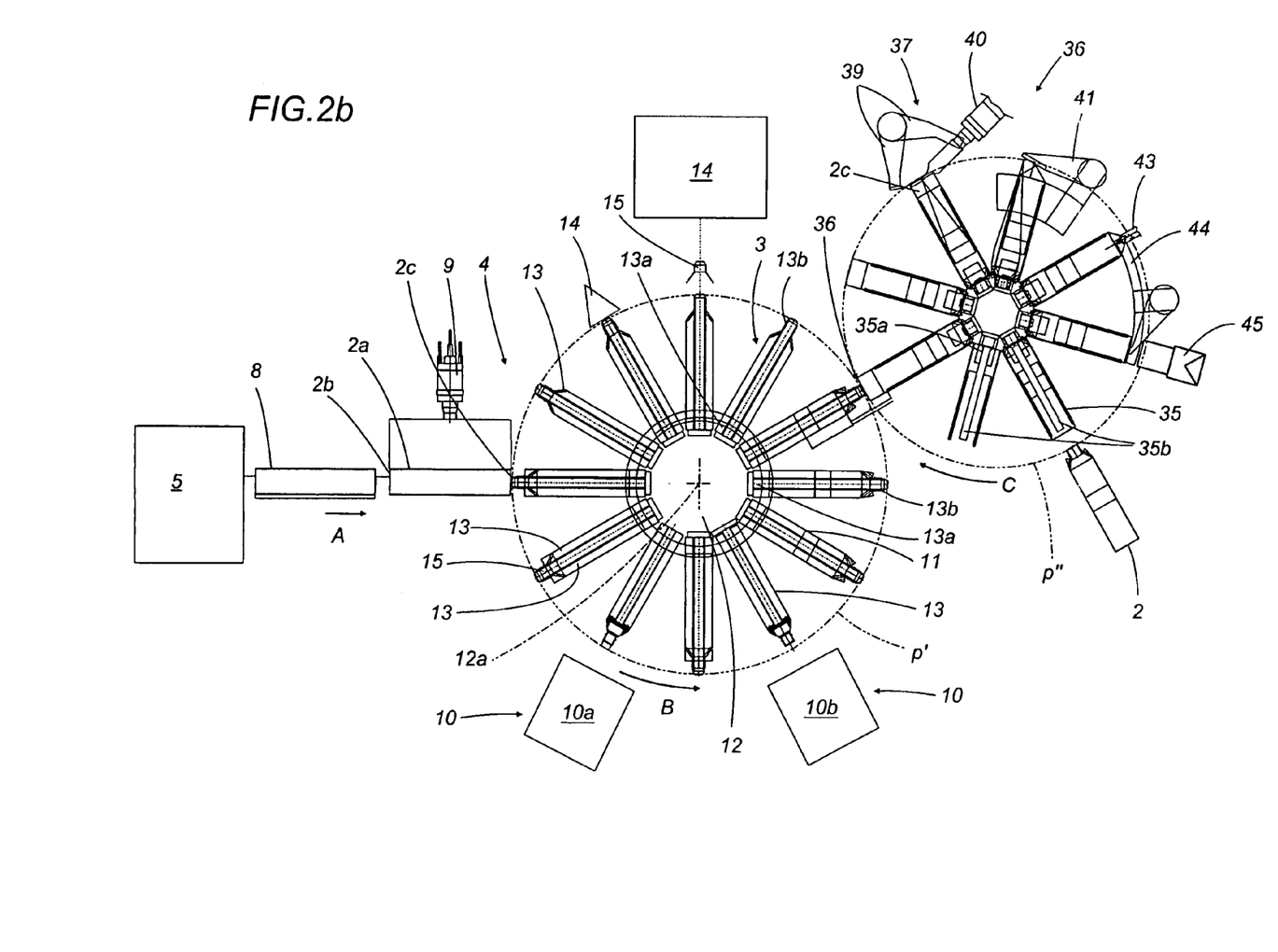
FIG. 2*b* shows a machine for forming containers, illustrated in an alternative second embodiment and viewed in a side elevation.

In the example of FIG. 2b, each holder element 34 accommodates an internal elongated member 35 likewise projecting radially from the hub 33a. The elongated member 35 presents a first end 35a anchored to the hub 33a, and a second end 35b opposite to the first end 35a, positioned to coincide with the access opening 34a.

It will be noted that when a tubular element 2a is positioned internally of the corresponding holder element 34, the elongated member 35 is inserted into the selfsame element 2a through the mouth 15a presented by the neck 15 sealed previously to the tubular element 2a during its passage around the first conveying mechanism 3.

Moreover, the machine also comprises a transfer device 60 operating between the first wheel 11 and the second wheel 33 and capable of alternating between a first position, in which it takes up a tubular element 2a facing the second wheel 33 and carried by a relative supporting element 13, and a second position in which the tubular element 2a is placed by the device 60 in a corresponding holder element 34, causing the elongated member 35 to pass through the mouth 15a of the neck 15 and into the tubular element 2a, and positioning the second open end 2c externally of the access opening 34a.

The transfer device 60 is not described and illustrated in detail, being of a type widely used in the art field to which the invention relates. By way of example, the device could consist in a set of suction cups positionable against the outer surface of the tubular element 2a and carried by a mechanical arm such as will direct the tubular element 2a into the holder element 34.

The second sealing means 36 are designed to interact with the second open end 2c of the tubular element 2a, in such a manner as to close the selfsame second end 2c and complete the container 2.

Figure 7A:
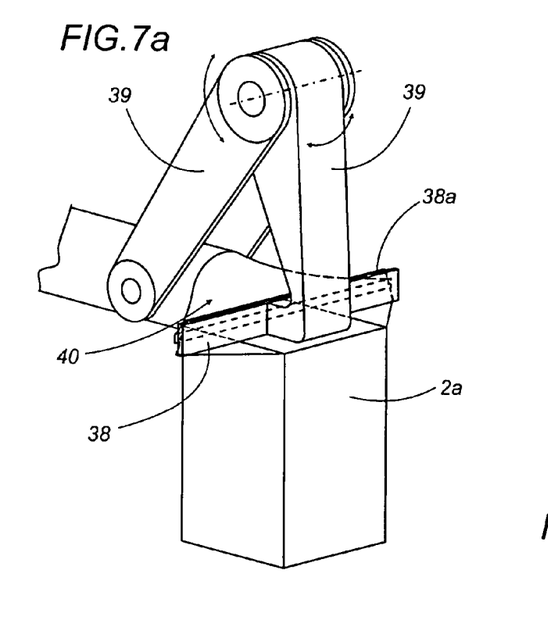
FIGS. 7*a* to 7*e* show parts of the machine by which different sequences of operating steps are effected on a portion of the container in process.
Figure 7B:
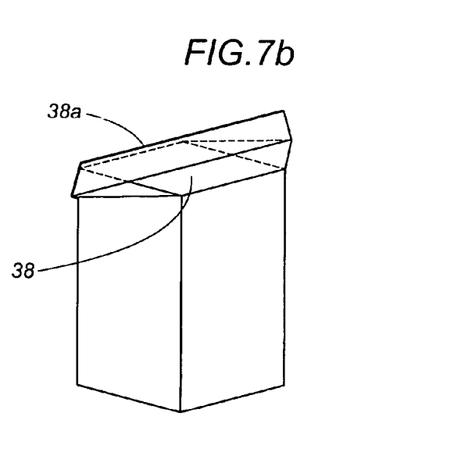

In particular, the second sealing, means 36 consist in a joining head 37 able to interact with the second open end 2c of each tubular element 2a, and as a result to unite two mutually opposed sides 38 of the tubular element 2a coinciding with this same end 2c (see FIGS. 7a and 7b). More precisely, the two sides 38 coincide with two opposite faces of the tubular element 2a and are united in such a way as to bring together two respective top edges 38a extending transversely to the longitudinal dimension of the tubular element 2a as a whole.

Still referring to FIG. 7a, it will be seen that the joining head 37 comprises two folder elements 39 that can be offered to the corresponding sides 38 in such a way as to draw together and match the respective top edges 38a. The head 37 also presents a sealer 40 operating on the two edges 38a in such a manner as to secure them one to another.

Figure 7C:
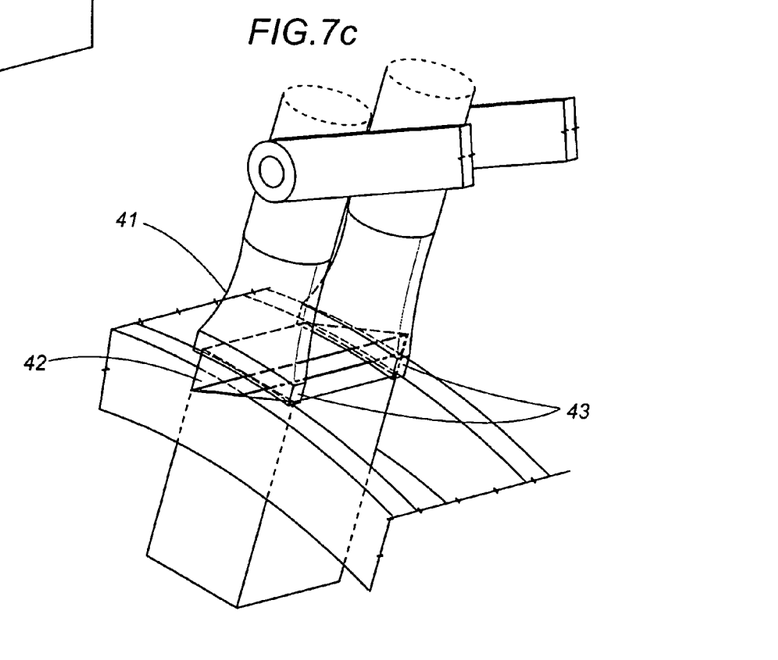

The second sealing means 36 also include a press 41 (shown in FIG. 7c) located downstream of the joining head 37, considered in reaction to the second feed direction C, operating on the joined sides 38 in such a way as to force them toward the hub 33a. The effect of the forcing action is to produce a flat base surface extending substantially transverse to the longitudinal dimension of the tubular element. The action of the press 41 also generates two opposite end folds 42 projecting laterally beyond the relative side walls of the tubular element 2a and presenting a substantially triangular outline.

The second sealing means 36 can also be equipped with a first sealer or welder 43 (FIG. 7c) such as will engage seal lines delimiting the end folds 42, thereby joining the two flattened thicknesses of material and creating a bottom surface of the container. To advantage, the tips of the end folds will be dabbed with glue of conventional type. Also associated with the sealing means, at a given point downstream of the first sealer 43 along the second feed direction C, is a fixed fold guide 44 extending along the second sealing path P''', positioned in such a way that the end folds 42 will be engaged and bent inwards over the previously flattened sides 38.

In the case of the first example illustrated in FIG. 2a, the glued tips of the bent end folds 42 are united by the action of a movable arm 45b.

Figure 7D:
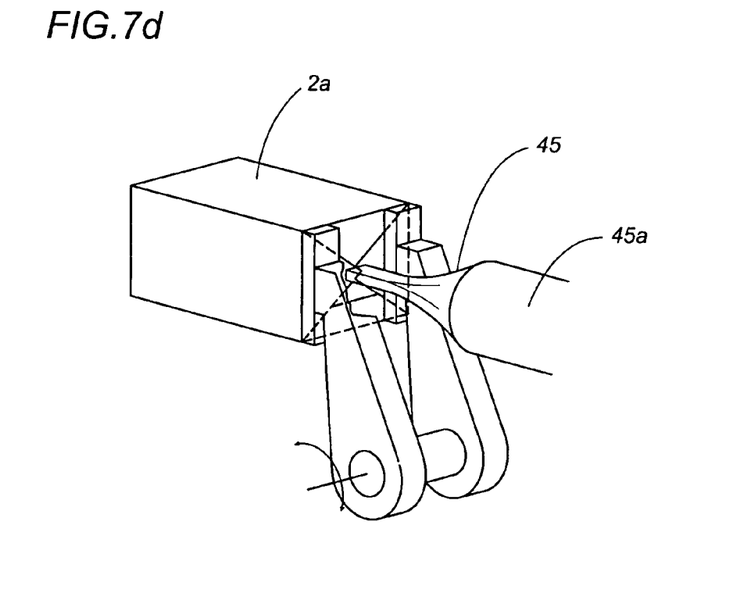
Figure 7E:
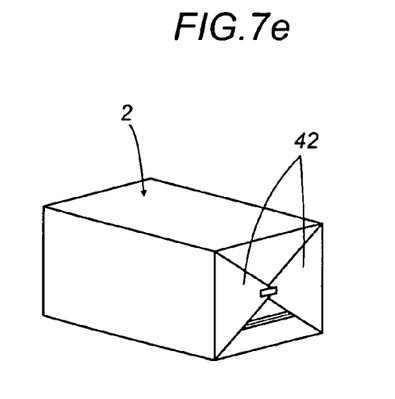

In the case of the second example illustrated in FIG. 2b, the end folds 42 are united through the agency of a second sealer or welder 45 (FIG. 7d) by which the overlapping tips are fused together to complete the container 2 (FIG. 7e).

In this instance, the second sealer 45 is embodied as a movable arm 45a capable of vertical movement and directed against the bent end folds 42 at a point coinciding with the second end 35b of the elongated member 35, which is located immediately below the access opening 34a of the holder element 34.

Also operating downstream of the second sealing means 36, along the second feed direction C, is an outfeed device 46 of conventional type, not described in detail, by which each completed container 2 is removed from the corresponding holder element 34 and directed toward further finishing stations.

The operation of the machine 1, described thus far essentially in structural terms, is as follows.

Tubular elements 2a prepared initially by the forming device 5 in the manner already described are directed into the feed station 4.

The tubular elements 2a pass along the infeed direction A (FIG. 2) and are taken up by the first conveying mechanism 3. More exactly, the tubular elements 2a are taken up onto the wheel 11 in such a way that each supporting element 13 is ensheathed by a respective tubular element 2a. It will be observed that the motion of the wheel 11 is not continuous; rather, the hub is indexed in such a way that the supporting elements 13 are brought into alignment with the feed station 4, then with the first sealing means 10 and thereafter with the second conveying mechanism 32.

Each tubular element 2a is thus positioned on the relative supporting element 13 with the first open end 2b positioned at the second end 13b of the selfsame element 13, on which a neck 15 will have been positioned previously by the relative feed device 14.

The tubular element 2a now advances along the first sealing path P' toward the first joining head 10a. With the tubular element 2a in position, the first forming elements 18 and reaction elements 21 assume their respective operating positions (FIG. 5b) in greater detail, the first forming elements 18 engage the first top faces 16, and the material is secured along the seal lines 20. At the same time, the first reaction elements 21 engage the second top faces 17, with the result that the neck 15 is restrained by the locating portions 23 and aligned with the tubular element 2a, and the central surface 17a is forced to assume the intended trapezoidal outline. The shape in question is imparted to the central surface 17a by the flat central portion 21a of the first reaction element 21, of which the projecting profile impresses both the central surface 17a and the two adjoining fins 25 at one and the same time.

Thereafter, the first forming elements 18 and the first reaction elements 21 resume their respective idle positions (FIG. 5a) to release the tubular element 2a, which is advanced toward the second joining head 10b.

In like manner, the second forming elements 26 and the second reaction elements 28 now assume their respective operating positions (FIG. 6b). In more detail, the second forming elements 26 engage the previously impressed second top faces 17, so that the seal can be made along the lines 20 connecting the neck 15. At the same time, the second reaction elements 28 engage the first top faces 16, with the result that the neck 15 is restrained by the locating portions 30, and the central surfaces 16a are forced to assume the intended trapezoidal outline. The shape in question is imparted to the central surface 16a by the flat central portion 31a of the second reaction element 28, of which the projecting profile impresses both the central surface 16a and the two adjoining fins 25 at one and the same time.

At this juncture, with the neck 15 fitted to the first end 2b of the tubular element 2a, the tubular elements are directed toward the transfer device 60.

The partly formed tubular elements 2a are directed each into a relative holder device 34 of the second conveying mechanism 33, with the elongated member 35 inserted through the mouth 15a of the neck 15. In this situation, the tubular element 2a is positioned internally of the corresponding holder element 34 with the neck 15 positioned at the first end 35a of the elongated member 35.

From here, the tubular elements 2a are advanced along the sealing path P''' in the second feed direction C toward the second sealing means 36.

The tubular elements 2a pass beneath the joining head 37, by which the aforementioned sides 38 are drawn together and bent so as to unite the respective top edges 38a. The sealer 40 passes along the full length of the top edges 38a, securing them one to another (FIG. 7a).

Thereafter, the press 41 will force the joined sides 38 against the wheel 33 in such a way as to generate a flat surface (FIG. 7c) extending substantially transverse to the longitudinal dimension of the tubular element 2a and presenting the two end folds 42.

To advantage, the first sealer or welder 43 following the press 41 is applied to seal lines positioned to delimit the end folds 42, so that these can be united to create the square base of the container 2.

The tubular elements 2a thus formed are advanced subsequently through the fixed fold guide 44, which will bend the end folds 42 inward and over the joined sides 38. Finally, in the case of the example shown in FIG. 2a, the glued tips of the end folds 42 will be united by the movable arm 45b (FIG. 7e) in conventional manner.

Alternatively, in the case of the example shown in FIG. 2b, the arm 45a of the second sealer 45 will engage the overlapped end folds 42, impinging on the second end 35a of the elongated member 35 located internally of the tubular element 2a and in alignment with the point at which the end folds 42 are overlapped. The tubular element 2a is thus closed at both ends 2b and 2c to complete the container 2.

The container 2 is now conveyed to the outfeed device 46, where it is removed from the holder element 34 and advanced toward further finishing stations.

The problems associated with the prior art are overcome in accordance with the present invention, and the stated objects duly realized.

First and foremost, it will be noted that the machine 1 is designed to form the container 1 in its entirety. Employing the two rotary conveying mechanisms, in effect, the tubular element 2a is first assembled and then the bottom end then closed, so that there are no further passages or movements of the tubular element needed to form the container 2.

Consequently, the time taken to product the single container 1 is reduced, and the production costs are reduced.

Also, since there is no conveyor link between one wheel and the other, the machine 1 can be made more compact and suitable for use in any given system for forming containers used in the packaging of food and similar products.

The invention claimed is:

1. A machine for forming containers, comprising:
   a first conveying mechanism comprising at least a first wheel comprising a central hub rotatable about a respective axis, with a plurality of supporting elements projecting radially from the hub and each presenting a first end anchored to the hub and a second end remote from the first end; wherein said first wheel is rotatable in a first feed direction along a first circular sealing path passing through a feed station supplying a single file of tubular elements which are fitted over the respective supporting element,
   first sealing means positioned downstream of the feed station, relative to the first feed direction, operating on a first open end of each tubular element in such a way as to enclose the selfsame first end;
   a feed device, placed upstream of the feed station considered in relation to the first feed direction, supplying necks for the containers by placing them on the second end of each supporting element; wherein said first conveying mechanism is movable between a position in which the tubular elements are taken up from the feed station, and a position in which the selfsame tubular elements are offered to the first sealing means; and
   a second conveying mechanism operating in conjunction with the first conveying mechanism, downstream of the first sealing means considered in relation to the first feed direction, and comprising a second wheel, similar to the first wheel and rotatable in a second feed direction, along a second circular sealing path tangential to the first sealing path; wherein the second conveying mechanism is movable between a position in which the tubular elements are taken up from the first conveying mechanism, and a position in which the selfsame tubular elements are offered to second sealing means operating on a second open end of each tubular element opposite to the first end open, in such a way as to enclose the selfsame second end and complete the container.

2. A machine as in claim 1, wherein each supporting element of the wheel presents a substantially parallelepiped shape matched to the internal geometry of the tubular element in such a way that each tubular element an be fitted over a respective supporting element with the relative first open end positioned at the second end of the supporting element.

3. A machine as in claim 1, wherein the first sealing means comprise a first joining head positioned to interact with the first open end of each tubular element and with the neck positioned on the second end of the supporting element in such a way as to join two mutually opposed first top faces of the tubular element, coinciding with the first open end, to two connecting portions constituting a base of the neck, also a second joining head operating downstream of the first joining head relative to the first feed direction, positioned to interact with the first open end of each tubular element and with the neck positioned on the second end of the supporting element in such a way as to join two mutually opposed second top faces of the tubular element, coinciding with the first open end, to two further connecting portions constituting the base of the neck.

4. A machine as in claim 3, wherein the first joining head comprises at least two mutually opposed first forming elements movable between a first idle position, distanced from the first top faces of the tubular element, and a second operating position in which the first top faces are engaged by the selfsame forming elements and sealed to the respective connecting portions of the neck.

5. A machine as in claim 4, wherein each first forming element comprises a heat sealer presenting heatable rectilinear portions applicable when in the operating position to respective seal lines presented by the first top faces of the tubular element.

6. A machine as in claim 4, wherein the first joining head further comprises two mutually opposed first reaction elements movable between a first idle position distanced from the second top faces of the tubular element, assumed when the first forming elements occupy the relative first idle position, and a second operating position of contact with the second top faces, assumed when the first forming elements occupy the relative operating position.

7. A machine as in claim 6, wherein each of the first and second reaction elements comprises a locating portion presenting a substantially U-shaped cross-sectional profile and contoured so as to match a top cylindrical portion of the neck when the corresponding reaction element occupies the operating position.

8. A machine as in claim 7, wherein each of the first and second reaction elements comprises a bearing surface presenting a flat central portion positioned below the locating portion and in such a manner as to engage a central surface of the corresponding top face.

9. A machine as in claim 8, wherein each of the first and second reaction elements further comprises two lateral portions of substantially triangular outline positioned along respective sides of the peripheral outline presented by the flat central portion, of which the surfaces are angled relative to the surface of the central portion in such a way that the selfsame central portion is caused to project.

10. A machine as in claim 9, wherein the flat central portion of the bearing surface presents a substantially trapezoidal outline of which the oblique sides coincide with the lateral portions.

11. A machine as in claim 3, wherein the second joining head comprises at least two mutually opposed second forming elements movable between a first idle position, distanced from the second top faces of the tubular element, and a second operating position in which the second top faces are engaged by the selfsame forming elements and sealed to the respective connecting portions of the neck.

12. A machine as in claim 11, wherein each second forming element comprises a heat sealer presenting heatable rectilinear portions applicable when in the operating position to respective seal lines presented by the second top faces of the tubular element.

13. A machine as in claim 11, wherein the second joining head further comprises two mutually opposed second reaction elements movable between a first idle position distanced from the first top faces of the tubular element, assumed when the second forming elements occupy the relative first idle position, and a second operating position of contact with the first top faces, assumed when the second forming elements occupy the relative operating position.

14. A machine as in claim 1, wherein the second wheel comprises a central hub rotatable about a respective axis, also a plurality of holder elements projecting radially from the hub.

15. A machine as in claim 14, wherein each holder element presents a substantially tubular appearance and comprises an access opening at the end farthest from the hub, also an internal surface matched to the external geometry of the tubular element, in such a way that each tubular element is insertable into a corresponding holder element with the second open end positioned at the access opening.

16. A machine as in claim 15, wherein each holder element accommodates an elongated member projecting radially from the hub, presenting a first end anchored to the hub and a second end, opposite to the first end, positioned to coincide with the access opening.

17. A machine as in claim 16, further comprising a transfer device operating between the first wheel and the second wheel and which can be alternated between a first position, in which a tubular element facing the second wheel carried by a relative supporting element is taken up by the device, and a second position in which the tubular element is placed in a corresponding holder element by the device, causing the elongated member to pass through the mouth of the neck and into the tubular element and positioning the second open end externally of the access opening.

18. A machine as in claim 17, wherein the second sealing means comprise: a joining head able to interact with the second open end of each tubular element in such a way as to unite two mutually opposed sides of the tubular element coinciding with the selfsame second open end; a press located downstream of the joining head, considered in relation to the second feed direction, operating on the two joined sides in such a manner as to flatten and force them toward the central hub and, in combination with corresponding restraints, to fashion two projecting end folds of the tubular element; a first sealer positioned to engage seal lines delimiting the projecting end folds; a fixed fold guide extending along the second sealing path, by which the end folds are engaged and bent inwards over the flattened sides; and a second sealer by which the end folds are secured one to another to complete the containers.

19. A machine as in claim 18, wherein the joining head comprises two folder elements that can be offered to the corresponding sides in such a way as to unite and match respective top edges of the two sides extending transversely to the longitudinal dimension of the tubular element, and a sealer by which the top edges are engaged and secured one to another.

20. A machine as in claim 17, wherein the second sealing means comprise: a joining head able to interact with the second open end of each tubular element, and consequently to unite two mutually opposed sides of the tubular element coinciding with the selfsame second open end; a press located downstream of the joining head, considered in relation to the second feed direction, operating on the two joined sides in such a manner as to flatten and force them toward the central hub and, in combination with corresponding restraints, to fashion two projecting end folds of the tubular element; a first sealer positioned to engage seal lines delimiting the projecting end folds; a fixed fold guide extending along the second sealing path, by which the end folds are engaged and bent inwards over the flattened sides; and an arm by which end folds treated previously with glue are caused to bond one to another to complete the container.

21. A machine as in claim 20, wherein the second sealer comprises an arm vertically movable and positionable against the bent end folds at a point coinciding with the second end of the elongated member.

22. A machine as in claim 1, wherein the tubular elements are prepared by a forming device coinciding with and operating at the feed station and comprising: a gripper element such as will bend a blank of material around a former of shape corresponding to the shape of the tubular element, in such a way that one longitudinal edge of the selfsame blank will overlap the other; a sealer serving to join the longitudinal edges and create the tubular element; and a feed mechanism by which the tubular element is caused to advance along a radial infeed direction toward the first conveying mechanism.

23. A machine as in claim 1, wherein the tubular elements are prepared by a forming device coinciding with and operating at the feed station and comprising a gripper element that can be offered to the opposite edges of a precreased tubular blank presenting an essentially flat rhomboidal cross section in such a way as to apply a compressive force and thus cause the flattened profile to expand to the point at which the blank presents a substantially square profile in section.

* * * * *